US005548198A

United States Patent [19]

Backstrand

[11] Patent Number: 5,548,198
[45] Date of Patent: Aug. 20, 1996

[54] SHARED INVERTER ELECTRICAL DRIVE SYSTEM

[75] Inventor: Jon E. Backstrand, Oak Creek, Wis.

[73] Assignee: Harnischfeger Corporation, Brookfield, Wis.

[21] Appl. No.: 315,615

[22] Filed: Sep. 30, 1994

[51] Int. Cl.[6] .......... H02P 7/00

[52] U.S. Cl. .......... 318/799; 318/99; 318/432; 212/285

[58] Field of Search .......... 318/64, 112, 757, 318/799, 807, 465, 476, 366, 803, 99.49; 5/81 R, 83, 85, 89, 87; 244/63; 212/218, 159, 160, 161, 165, 205, 209

[56] References Cited

U.S. PATENT DOCUMENTS

| | | | |
|---|---|---|---|
| Re. 31,539 | 3/1984 | Spalluto | 200/81 H |
| 4,307,810 | 12/1981 | Spalluto | 212/160 |
| 4,614,274 | 9/1986 | LaValle et al. | 212/160 |
| 4,627,119 | 12/1986 | Hachey et al. | 5/83 |
| 4,678,143 | 7/1987 | Griffin | 244/63 |
| 4,719,361 | 1/1988 | Brubaker | 290/45 |
| 4,838,438 | 6/1989 | Ishige et al. | 212/159 |
| 4,944,056 | 7/1990 | Schroeder et al. | 5/81 R |
| 4,953,053 | 8/1990 | Pratt | 361/31 |
| 4,965,847 | 10/1990 | Jurkowski et al. | 388/814 |
| 5,077,508 | 12/1991 | Wycoff et al. | 318/436 |
| 5,142,468 | 8/1992 | Nerem | 363/71 |
| 5,210,473 | 8/1993 | Backstrand | 318/99 |
| 5,319,292 | 6/1994 | Backstrand | 318/371 |
| 5,331,267 | 7/1994 | Anderson | 318/799 |
| 5,343,134 | 8/1994 | Wendt et al. | 318/757 |
| 5,352,965 | 10/1994 | Kawabata | 318/807 |
| 5,361,565 | 11/1994 | Bayer | 318/112 |

*Primary Examiner*—Paul Ip
*Attorney, Agent, or Firm*—Jansson & Shupe, Ltd.

[57] ABSTRACT

The disclosure involves a drive system having a control section, an adjustable frequency drive unit coupled to the control section, and first and second drive motors. The drive system is used with a material handling machine such as a light-duty crane on which any two of the hoist, bridge and trolley drives are rarely used simultaneously and in any event need not be used simultaneously. The drive unit is a scalar or flux vector (feedback-type) inverter and is the sole drive unit providing electrical power to the drive motors. Preferred control is by a pendant station or radio transmitter. Operating a pushbutton on the pendant station (or a paddle-like stick control on the transmitter) for a particular drive motor "locks out" operation of the other motors. Motors are operated on a first-come, first-served basis.

8 Claims, 8 Drawing Sheets

| PARAMETER NAME | VALUE | UNITS |
|---|---|---|
| MAX SPEED | 1200 | RPM |
| MIN SPEED | 1 | RPM |
| LOWER ACCEL | 1.5 | SEC |
| LOWER DECEL | 3.1 | SEC |
| RAISE ACCEL | 3.1 | SEC |
| RAISE DECEL | 1.5 | SEC |
| SPEED DEV LOWER ACCEL | 100 | RPM |
| SPEED DEV LOWER DECEL | 100 | RPM |
| SPEED DEV RAISE ACCEL | 100 | RPM |
| SPEED DEV RAISE DECEL | 100 | RPM |
| MAX LOWER SPEED | 1200 | RPM |
| MAX RAISE SPEED | 1200 | RPM |

119 115 117 111

FIG. 6

| PARAMETER NAME | VALUE | UNITS |
|---|---|---|
| MAX SPEED | 1200 | RPM |
| MIN SPEED | 1 | RPM |
| FWD ACCEL | 4.9 | SEC |
| FWD DECEL | 4.9 | SEC |
| REV ACCEL | 4.9 | SEC |
| REV DECEL | 4.9 | SEC |
| SPEED DEV FWD ACCEL | 100 | RPM |
| SPEED DEV REV ACCEL | 100 | RPM |
| SPEED DEV REV DECEL | 100 | RPM |
| SPEED DEV REV DECEL | 100 | RPM |
| MAX FORWARD SPEED | 1200 | RPM |
| MAX REVERSE SPEED | 1200 | RPM |

129 119 127 113

FIG. 7

SHARED INVERTER ELECTRICAL DRIVE SYSTEM

FIELD OF THE INVENTION

This invention relates generally to electricity and, more particularly, to electrical motive power systems.

BACKGROUND OF THE INVENTION

The two prevailing types of "prime movers" used to power machines are internal combustion engines and electric motors. The former are widely used for applications involving a machine which is mobile to the extent that it is impractical or impossible to provide electrical power to it. Examples include diesel locomotives, automobiles, ships and the like.

On the other hand, electric motors are used for stationary machines or for machines for which electrical power is readily provided even though such machines are, to some degree, mobile with respect to their surroundings. Examples of machines of the latter type include factory presses and material handling machines, e.g., overhead travelling cranes.

While overhead cranes travel on railroad-type rails suspended over the floor of, say, a factory, it is a relatively simple matter to provide electrical power to such cranes through a collector rail system. Such a system has plural, spaced, stationary horizontal bars mounted adjacent to the rails on which the crane rides and connected to an electrical power system. "Pick-up" shoes mounted on the crane slide along the bars and provide electrical power to the crane.

Many overhead travelling cranes are so-called "three-motion" cranes in that they have hoist, bridge and trolley drive motors. The hoist motor powers the drum for raising and lowering loads, the bridge motor powers the crane drive wheels for moving the crane along the rail and the trolley motor powers a trolley which moves on separate rails mounted on the bridge. Thus, such a crane can provide three axes of load movement, i.e., up/down (hoist), forward/reverse (bridge) and left/right (trolley). And cranes having two hoists or two trolleys are not all that uncommon. Four or even five drive motors may be involved.

Known overhead travelling cranes have a separate "dedicated" power supply for each motor. This arrangement permits any two or (if the operator is highly proficient and very careful) all three motors to be operated simultaneously. Of course, each power supply has to be made or otherwise procured by the crane manufacturer and the crane must be configured to provide a mounting space for each. And the weight of such power supplies must be taken into account when designing certain structural components of the crane.

Certain overhead cranes are used for light-duty service, e.g., Class C or Class D service as those classes are defined by the Crane Manufacturer's Association of America. Cranes for such light-duty service are used only occasionally. And when used, they are usually operated by a person having other primary job responsibilities. Such persons are often "novice" operators who use only a single crane "function" at any particular time. And for an occasionally-used light-duty crane, the time lost is not significant overall.

While occasional crane use and "one-function-at-a-time" operation have been recognized for some time as characterizing light duty cranes, no one (insofar as is now known) has recognized a disadvantage of such cranes. And if recognized, no solution is now known to have been put forth.

As further background, it is to be appreciated (as owners and users of light-duty cranes do) that such cranes are preferably built to the minimum standards and with the minimum equipment that will do the job. Such cranes are not production "tools" (rather, like a power house service crane, they are often used merely for maintenance-type functions) and their acquisition cost represents more of an expense than an investment in capital equipment used for production.

An improvement which reduces the cost and weight of a light-duty crane and which recognizes the operating requirements of such a crane would be an important advance in the art.

OBJECTS OF THE INVENTION

It is an object of the invention to provide an improved drive system overcoming some of the problems and shortcomings of the prior art.

Another object of the invention is to provide an improved drive system suitable for use with light-duty cranes.

Another object of the invention is to provide an improved drive system which can lower the cost of a crane.

Yet another object of the invention is to provide an improved drive system which reduces the component mounting space required to be provided on a crane.

Another object of the invention is to provide an improved drive system which provides "one-function-at-a-time" operation.

Still another object of the invention is to provide an improved drive system which reduces crane weight. How these and other objects are accomplished will become apparent from the following descriptions and from the drawing.

SUMMARY OF THE INVENTION

The invention involves a drive system having a control section and an adjustable frequency drive unit coupled to the control section for providing electrical power to a motor. There are first and second drive motors and first and second selection devices, pushbuttons or the like, coupled to the control section and associated with the first and second motors, respectively. The drive unit is the sole drive unit providing electrical power to the two drive motors.

It is to be appreciated that the invention has great utility with drive systems having but two drive motors to be operated individually. However, the invention is equally applicable to systems having three or more drive motors.

The drive unit provides electrical power to the first drive motor in response to actuation of the first selection device. There are first and second lockout devices, e.g., relays with relay contacts, and when the first motor is energized, the first lockout device prevents energization of the second motor.

In one specific embodiment, the first and second selection devices each comprise an electrical contact. The second selection device, which must be closed to energize the second drive motor, is in series with an electrical contact of the first lockout device. Thus, when the first selection device is closed, the contact of the first lockout device opens. And since such contact is in series with the second selection device, such second selection device is ineffective (even though closed) to energize the second motor. This feature helps assure "one-function-at-a-time" operation.

There is a likelihood (perhaps a high likelihood) that the machine to which the system is applied will require different performance characteristics from each of the different motors. This will almost certainly be true where one motor is asymmetrically loaded as is the case with a hoist motor. (Such motor is asymmetrically loaded since a load suspended from the hoist will resist upward movement but aid downward movement, both because of the force of gravity. An upward-inclined conveyor is another example of an asymmetrical load. The conveyed material resists being moved upward and tends to urge the conveyor backwards.)

In another aspect of the invention, the system includes first and second sets of drive parameters relating to the first and second motors, respectively. Where the first motor drives a hoist for raising and lowering loads, the first set of parameters includes a parameter establishing the maximum acceleration rate in the load-lowering direction and a different parameter establishing the maximum acceleration rate in the load-raising direction.

For example, the former parameter may require that acceleration from zero to full motor speed in the lowering direction occur in no less than, say, 1.5 seconds. In contrast, the latter parameter may require that acceleration from zero to full motor speed in the raising direction occur in no less than, say, 3.1 seconds.

But other parameters for the first motor and/or the second motor may be the same for either motor direction and for either or both motors. As another example, the first and second sets of drive parameters each include a minimum motor speed parameter and substantially the same minimum motor speed parameter, e.g., one RPM, is used for each set of drive parameters.

The drive unit, preferably an adjustable frequency inverter, may be either of the "scalar" or "flux vector" type. The former type, which may be referred to as an open loop inverter, supplies electrical power to a motor at a voltage and at a frequency related to such voltage, both generally increasing or decreasing simultaneously. However, there is no "feedback" signal to indicate whether the motor is running at a speed commensurate with such voltage and frequency.

A flux vector inverter is of a type of drive known as a closed loop type. When the new system uses such an inverter (as it usually will if a hoist or other asymmetrical drive is involved), the system includes a shaft encoder coupled to the first motor for providing a feedback signal to the system. Such signal "tells" the system such information as how fast the motor is running, how rapidly it is accelerating and decelerating and the like.

In a highly preferred embodiment, the drive unit has a set of shaft encoder terminals and the first and second motors have first and second shaft encoders attached respectively thereto. Each encoder provides an encoder output signal related to the motor to which it is attached. Both of the encoder output signals are applied to the same shaft encoder terminals on the drive unit but, of course, at different times. And only one encoder signal is applied at a time. This is quite a contrast from known drive units which have a set of encoder terminals dedicated to the encoder powered by such unit. No other encoder signals are brought to such unit.

The new system is particularly appropriate for use with a material handling machine such as a light-duty crane. Such cranes are often rigged with a pendant control station suspended from the machine. In such an arrangement, each of the selection devices includes a separate "stepped-function" push button mounted in the pendant control station. Such control station has plural output terminals providing a speed-related signal thereon and the same output terminals are used to provide speed-related signals for both the first and second selection devices.

(A stepped-function button closes a different one of several electrical contacts, depending upon how far the button is depressed. Each contact closure results in a different motor speed. In fact, each "motion" on a crane, e.g., the bridge motion, has two such function buttons associated with it, one each for forward and reverse travel.)

And while pendant control stations predominate in light-duty cranes, remote radio control is quite popular. With a radio-controlled crane, there is no physical attachment such as the pendant station "umbilical cord" (or "drop cord" as it is referred to in the industry) between the operator's control station and the crane.

In another embodiment, the first and second selection devices are on a radio-wave transmitter. At least one of the selection devices initiates a step-free speed-related signal from the transmitter. That is, the signal changes in a continuum and there are no discrete steps. It should be understood that radio control can also be configured to provide "stepped" control and that a pushbutton control station can be configured to provide step-free control.

(The term "radio-controlled" means that electromagnetic radiation (EMR) rather than a copper wire is the intelligence-carrying medium. The term "radio-wave transmitter" means a transmitter emitting EMR.)

In another aspect of the invention, the system has a first temperature sensor for the first motor. Such a sensor has a characteristic that changes with temperature or a contact which opens when the motor reaches an excessive temperature. Such first sensor is shorted except when the first selection device is actuated. Other details of the invention are set forth in the following detailed description and in the drawing.

BRIEF DESCRIPTION OF THE DRAWING

FIG. 6 is a table listing an exemplary set of parameters for a hoist drive.

FIG. 7 is a table listing an exemplary set of parameters for a bridge drive.

DETAILED DESCRIPTION OF PREFERRED EMBODIMENTS

Figure 1:
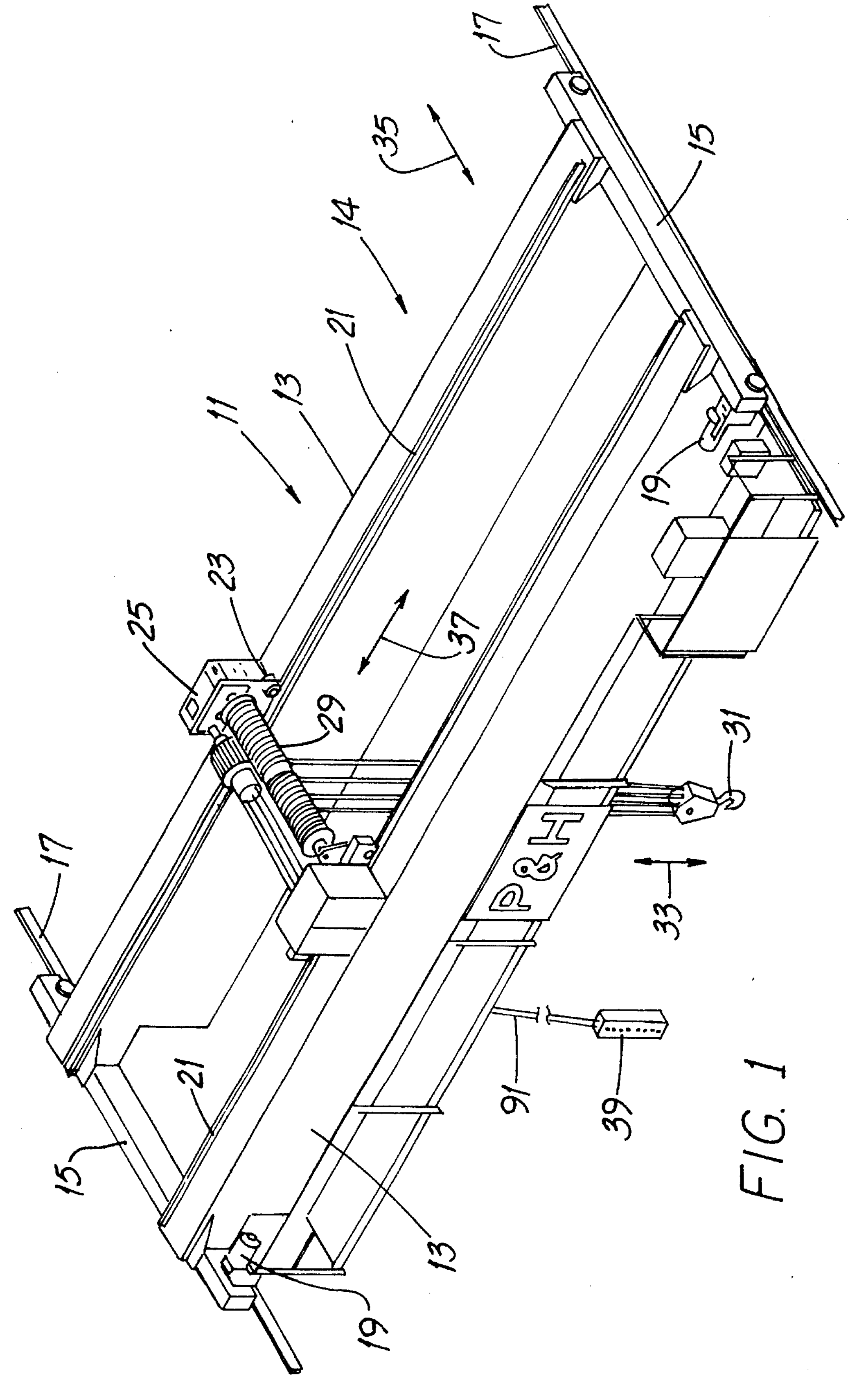
FIG. 1 is a perspective view of a representative light-duty crane, a type of machine which may be powered by the new system.
Figure 2A:
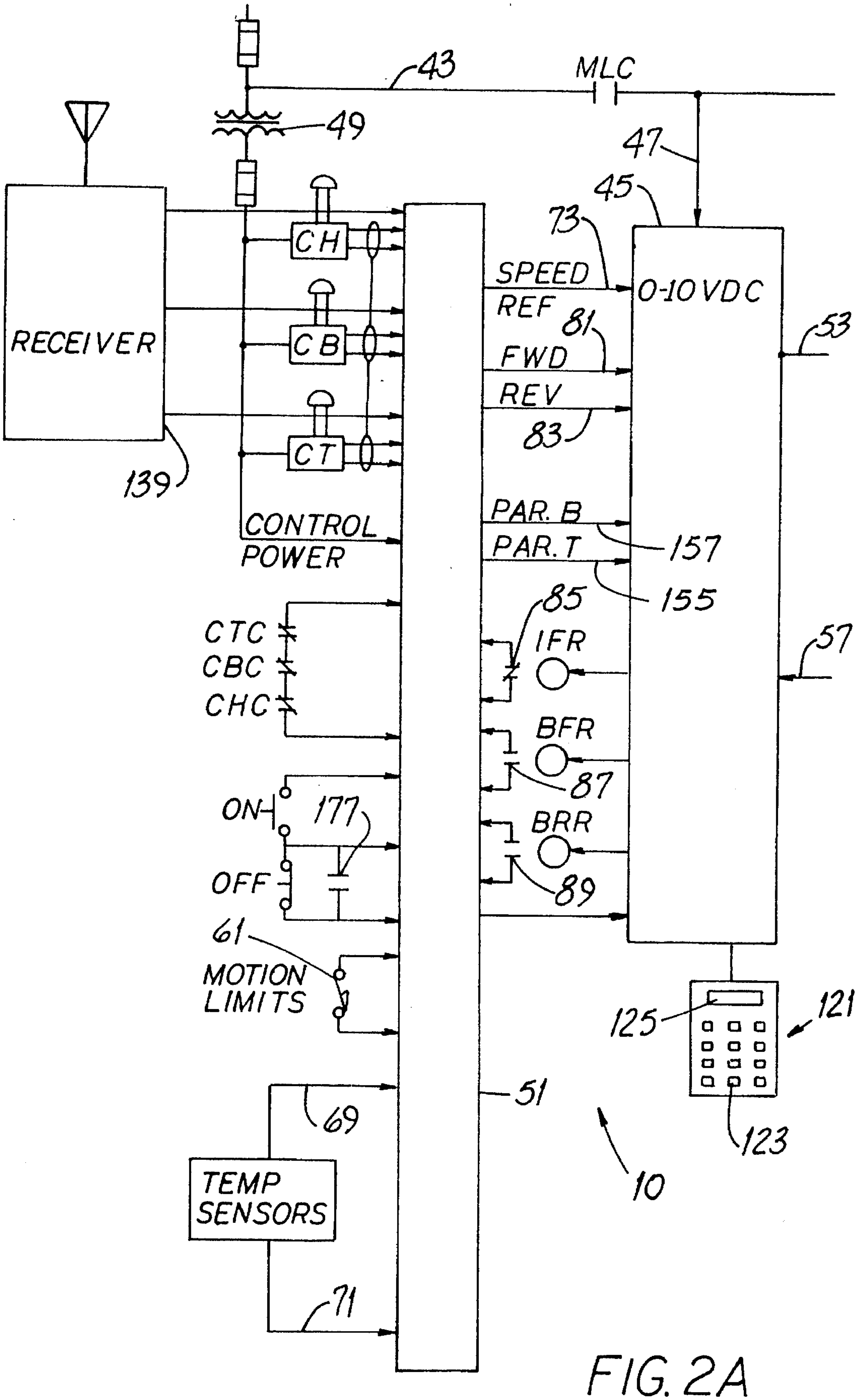
FIGS. 2A and 2B comprise a line diagram of the inventive "shared inverter" drive system and are referred to in the specification as "FIG. 2."
Figure 2B:
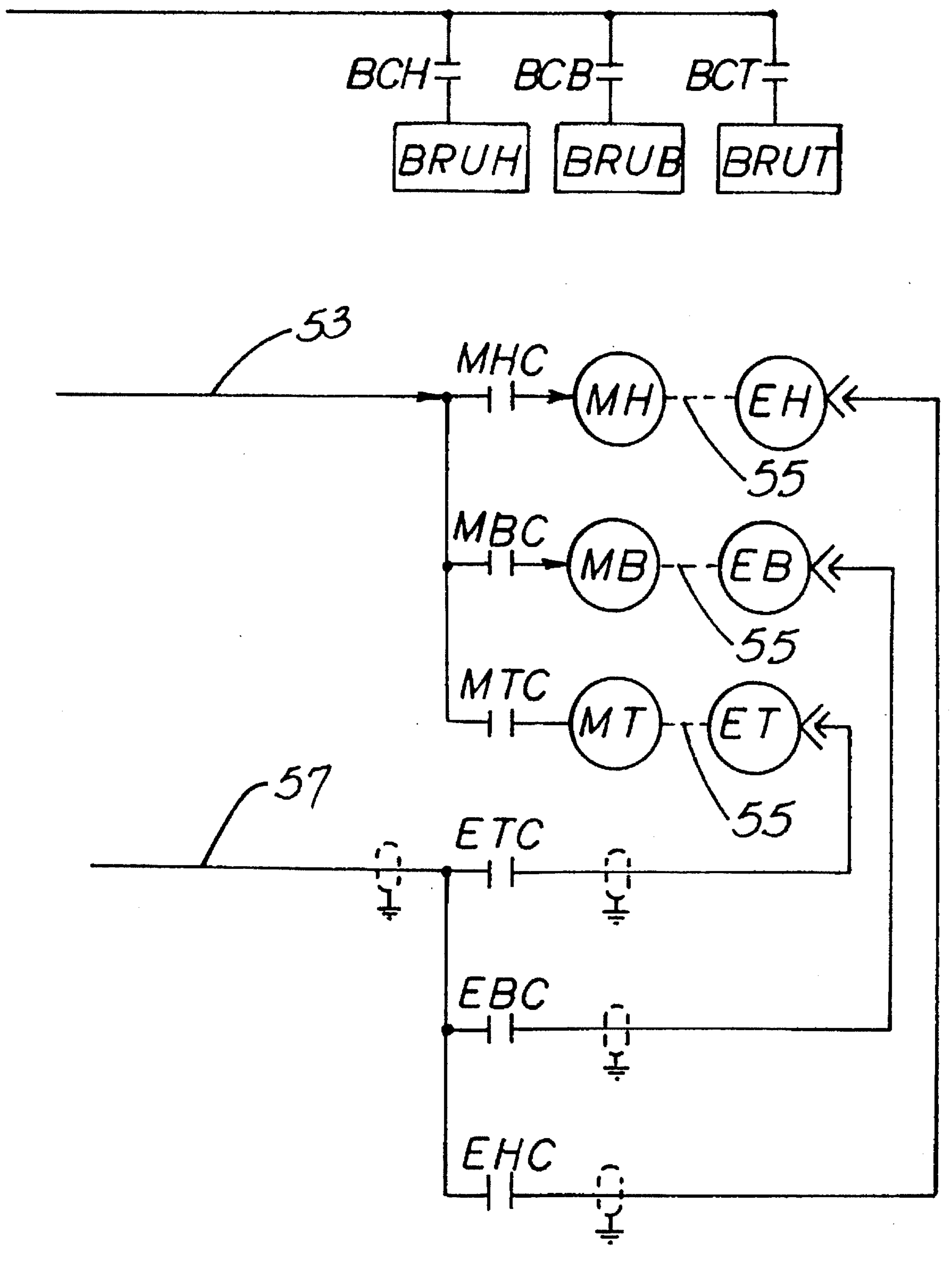

Before describing the new system 10, it will be helpful to have an understanding of how a representative light-duty material handling crane 11 is configured and how it operates. Referring to FIGS. 1 and 2, the crane 11 includes a pair of bridge girders 13 forming the crane bridge 14 which is attached to and supported by end trucks 15. Each truck 15 has a pair of flanged wheels riding on railroad-type rails 17 suspended above, e.g., a factory floor. While the depicted crane 17 has a bridge motor "MB" driving a wheel on each truck 15, another common arrangement is a single bridge motor MB driving both wheels through a long shaft called a line shaft.

Atop each bridge girder 13 is another railroad-type rail 21 supporting the flanged wheels 23 of a trolley 25 driven along the rails 21 by a trolley motor "MT". A hoist drum 29 and its drive motor "MH" are mounted on and travel with the trolley 25 and, of course, the trolley 25, hoist drum 29 and hoist motor "MH" travel with the bridge 14. The crane 11 is supported above a floor by support beams and columns, not shown.

When the hoist motor "MH" is operated, the load hook 31 moves up or down as indicated by the bidirectional arrow 33. When the bridge motor(s) 19 is operated, the entire crane 11 moves forward or reverse along the rails 17 as indicated by the bidirectional arrow 35 and the bidirectional arrow 37 indicates that the trolley 25 moves left or right on the bridge rails 21 when the trolley motor "MT" is operated.

Figure 3:
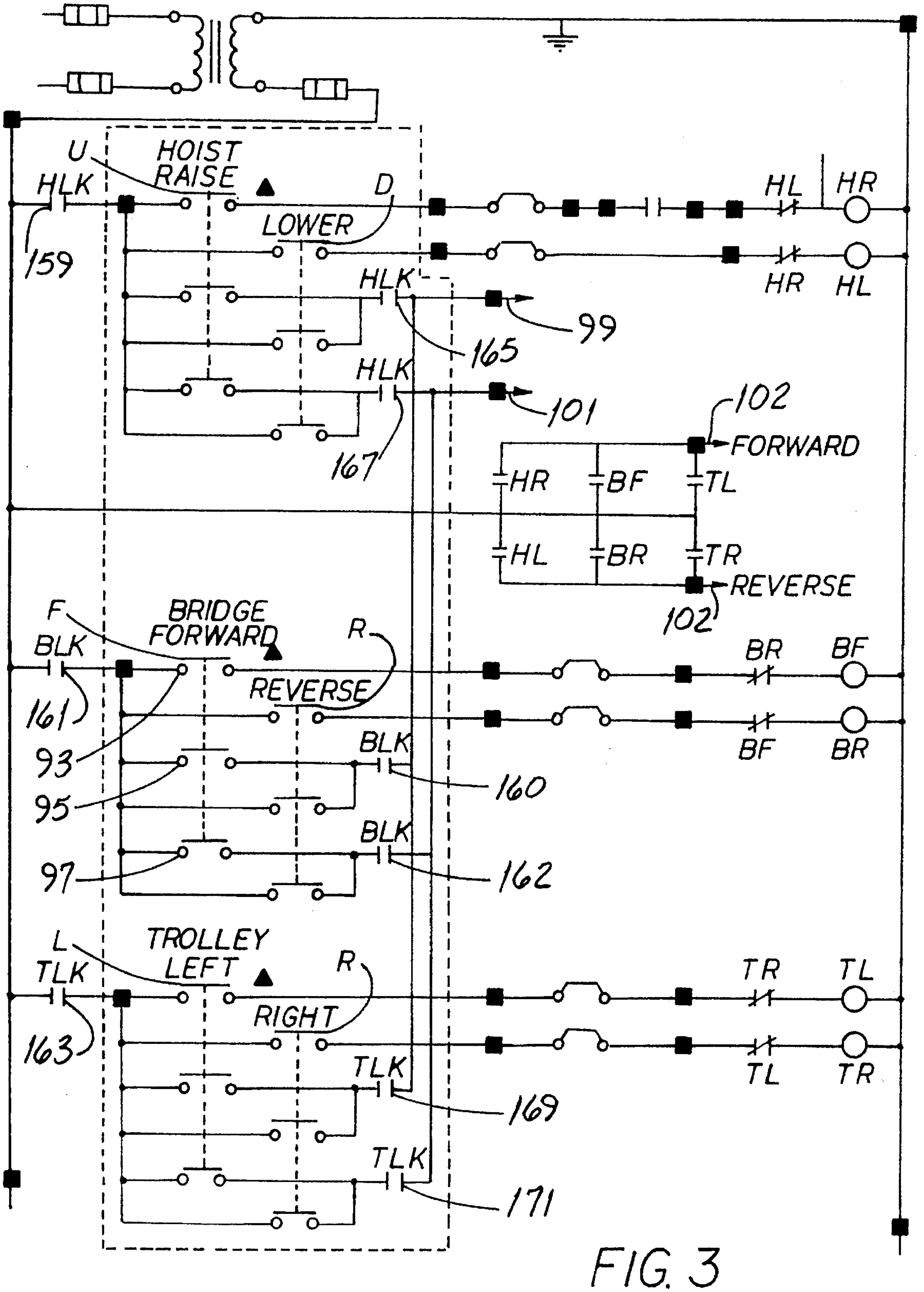
FIG. 3 is a simplified circuit diagram of a pushbutton type pendant control station and related components.
Figure 5:
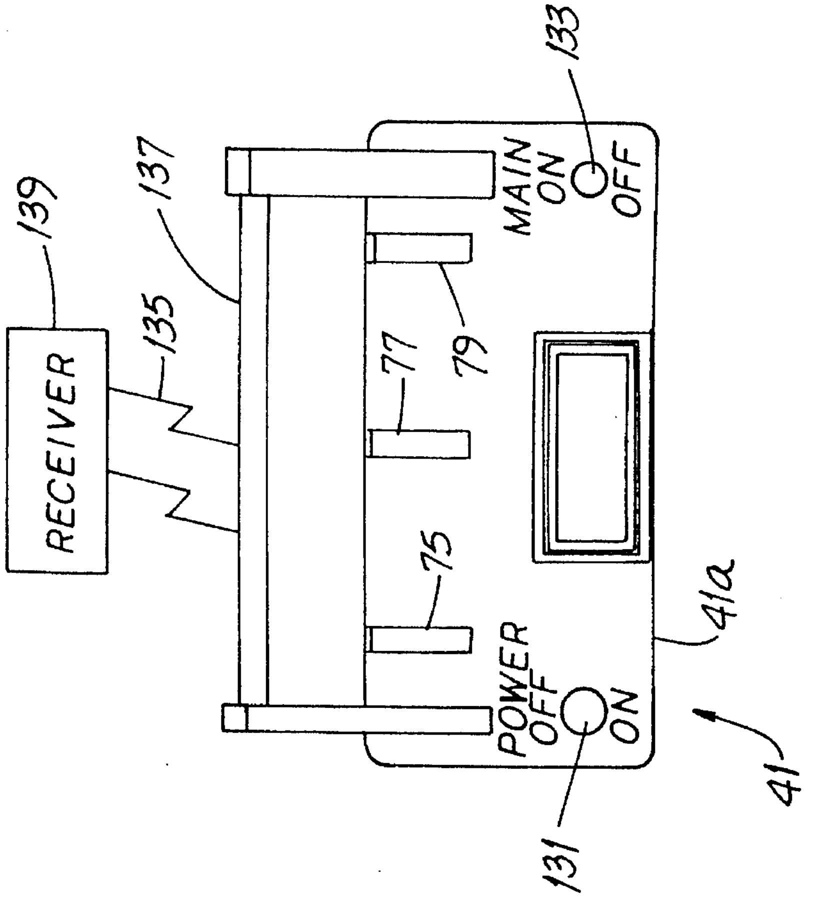
FIG. 5 is a front elevation view of a representative radio transmitter used with a radio-controlled crane.
Figure 4:
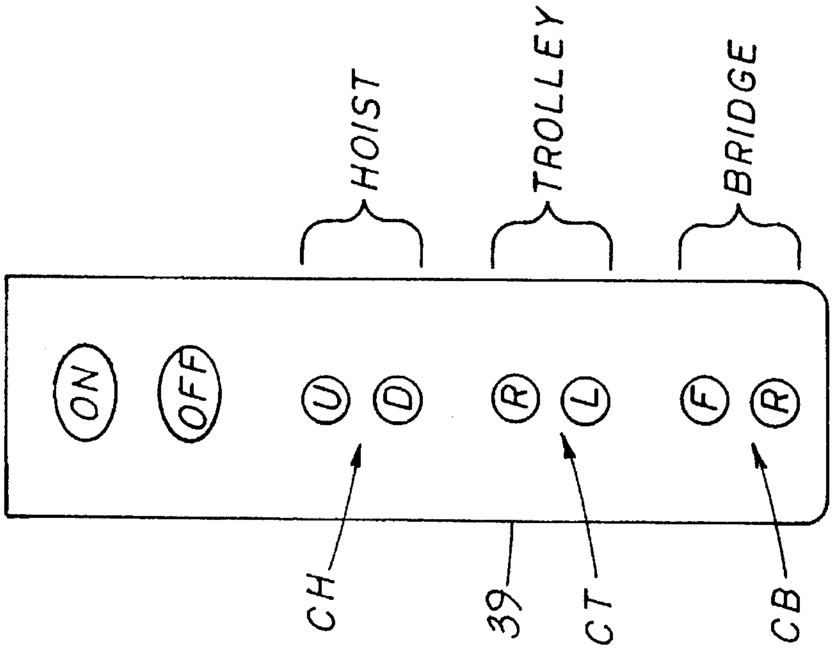
FIG. 4 is a front elevation view of a representative pendant control station.

Referring also to FIGS. 3, 4 and 5, aspects of the new system 10 will now be described. Such system 10 is assumed to be equipped with a pendant station 39 having first, second and third sets of selection devices CH, CB and CT, respectively. As described below, each set CH, CB, CT comprises two buttons for controlling a particular crane motor, e.g., the bridge motor "MB" involving set CB and having buttons F and R. An alternative control unit 41, a radio-wave transmitter 41a is described below.

The system 10 has a three-phase power bus to which are connected brake contactors BCH, BCB and BCT for the hoist, bridge and trolley motors MH, MB, MT, respectively. Each contactor operates a separate rectifier unit and brake BRUH, BRUB or BRUT, respectively. When, for example, the contactor BCH closes, the coil of the hoist brake BRUH is energized and such brake BRUH opens and permits the hoist motor MH to rotate. The bus 43 also supplies three-phase power to the adjustable frequency drive unit 45 along the line 47.

A single-phase control transformer 49 is connected to the bus 43 and supplies control power to the pendant station 39 and to the control section 51, the latter providing control logic and interface functions. The drive unit 45 is connected between the control section 51 and the hoist motor MH, the bridge motor MB and the trolley motor MT and supplies variable voltage, variable frequency power to a selected one of the motors MH, MB or MT along the line 53.

The shaft 55 of each of the first, second and third drive motors MH, MB and MT, respectively, has attached to it a shaft encoder EH, EB and ET, respectively. When a motor MH, MB or MT rotates, its encoder EH, EB or ET, respectively, is connected to the unit 45 by relay contacts EHC, EBC or ETC and such encoder EH, EB, ET provides a complementary set of output pulses along the line 57 to the drive unit 45. (In fact, a specific embodiment, each relay uses four contacts EHC, EBC or ETC to switch an encoder EH, EB or ET, respectively. FIG. 2 represents such arrangement with single contacts EHC, EBC or ETC).

It is to be appreciated that because of the contacts EHC, EBC and ETC—one of each of three encoder relays—each of all of the encoder output signals are applied to the line 57 and the same shaft encoder terminals "one at a time" since only one contact EHC, EBC or ETC is closed at a particular time. The appropriate set of performance parameters (discussed below) is selected by closure of another contact on each of the three encoder relays.

(Such encoder pulses comprise what is known as a "feedback" signal which is "interpreted" to indicate the direction and speed of motor rotation and the rate of motor acceleration or deceleration. Systems using feedback signals are known as closed loop systems.)

Considering the control section 51 again, other possible "inputs" thereto include three normally-closed contacts in series, i.e., contacts CHC, CBC and CTC. Such contacts are used only if the crane 11 is also equipped with hand-operated master switches (not shown) as are usually mounted in a crane cab. And such contacts CHC, CBC and CTC are closed only when such master switches are in the "off" position. Relatively few light-duty cranes 11 would be set up for operation from a crane cab using master switches.

The pendant station 39 also has ON and OFF buttons which are depressed to turn the system 10 on or off. A hoist limit switch contact 61 is connected to the section 51 and disables such section 51 if the contact 61 opens. An open contact 61 means that the load hook 31 has reached the upper limit of its travel and should not be raised farther. Optionally, limit switches may also be used as "travel" limits in connection with the bridge drive and/or trolley drive.

Each motor MH, MB and MT has a pair of motor temperature sensors, i.e., first, second and third pairs of sensors MTH, MTB, MTT, respectively, embedded therein. The sensors MTH, MTB, MTT are connected in series and if the related motor MH, MB or MT becomes overheated, the related sensor opens to disable the drive unit 45.

(It is to be appreciated that in practice, the sensors MTH, MTB, MTT may be used in connection with relays energized or de-energized thereby. A corresponding relay contact is connected in place of each sensor MTH, MTB, MTT for isolation purposes. The depiction of the drawing is for simplicity in explanation.)

Continuing reference to FIG. 2, connections between the control section 51 and the drive unit 45 will now be described. The control section 51 provides a speed reference signal to the drive unit 45 along the line 73. An exemplary reference signal is in the range of 0–10 VDC. When the crane 11 is equipped with a pendant station 39 providing "stepped" contact closure, the reference signal correspondingly changes in steps, e.g., 3.3 volts, 6.7 volts. On the other hand, when the crane 11 is operated using a radio-wave transmitter 41*a*, the exemplary selection devices 75, 77 79 are stepless and the reference signal changes in a continuum.

There is also a signal along a line 81 or 83 indicating to the drive unit whether a motor MH, MB or MT to be operated is to be powered in the forward/up/left or reverse/down/right direction, respectively. If the drive unit 45 develops a "fault," an inverter fault relay IFR is energized and its contact 85 opens to disable the system 10. Similarly, if the hoist brake fails to set and hold a suspended load, a brake failure relay BFR is energized and its contact 87 closed to enable the inverter drive unit 45 and the motor MH to controllably lower such load.

A brake release relay BRR has its normally-open contact 89 connected to the control section 51. When operating a hoist motor MH, if certain predetermined conditions are met, e.g., a certain minimum current is flowing through such motor MH and the voltage applied thereto is at or above a certain frequency, it is presumed there is enough torque available at the hoist motor shaft to prevent or substantially prevent "rollback" of the hoist drum 29 due to the presence of a suspended overhauling load.

U.S. Pat. No. 5,077,508 (Wycoff et al.) discloses a way in which the foregoing may be accomplished. U.S. Pat. No. 5,343,134 (Wendt et al.) discloses an approach to "brake-set checking," i.e., to determining whether the hoist brake is set and exhibits sufficient torque to hold a load in the absence of driving power from the motor MH. Such patents are incorporated herein by reference.

When the predetermined conditions are met, the hoist brake BRUH (which otherwise is the only instrumentality preventing rollback) is permitted to be released and, coincidently, the relay BRR is energized. Its contact 89 closes permitting operation.

The pendant station 39 will now be described in greater detail and an alternate control, a radio-wave transmitter 41*a* will also be described. Referring particularly now to FIGS. 1 and 4, the pendant station 39 is suspended from the crane 11 by the drop cord cable 91 and has first, second and third selection devices CH, CT and CB, respectively. Each device CH, CT, CB is embodied as a pair of stepped-function push buttons (e.g., buttons U and D) mounted on the station 39. In other words, each "motion" of the crane 11, i.e., hoist, bridge or trolley, has a pair of buttons such as pairs U and D, F and R and R and L, respectively, associated with such motion.

Referring particularly to FIGS. 2 and 3, push buttons on pendant stations often have up to five "steps" or discrete speed points. For the sake of simplification, a three-step arrangement is shown. By way of example, the operation of the bridge "forward" function will be described.

When the button F is initially depressed, its contact 93 closes first and energizes the bridge forward relay BF. Energization of such relay BF also causes an appropriate (forward or reverse) speed and direction signal at one of the lines 102 which, in turn, causes a speed reference signal (as a voltage) to appear on the line 73 via an electronic interface circuit board. In the depicted three-step arrangement, such signal is 3.3 volts assuming a 0–10 VDC overall range and also assuming that each button contact changes motor speed by one-third. When the button F is depressed farther, the contact 95 closes and causes a "second-step" speed reference signal, e.g., 6.7 volts, to appear on the line 73. And when the button F is fully depressed, the contact 97 is closed and the speed reference signal on the line is 10 volts. In the line diagram of FIG. 3, the lines 99, 101 and 102 affect the level of the voltage on the line 73 in FIG. 2.

Figure 8:
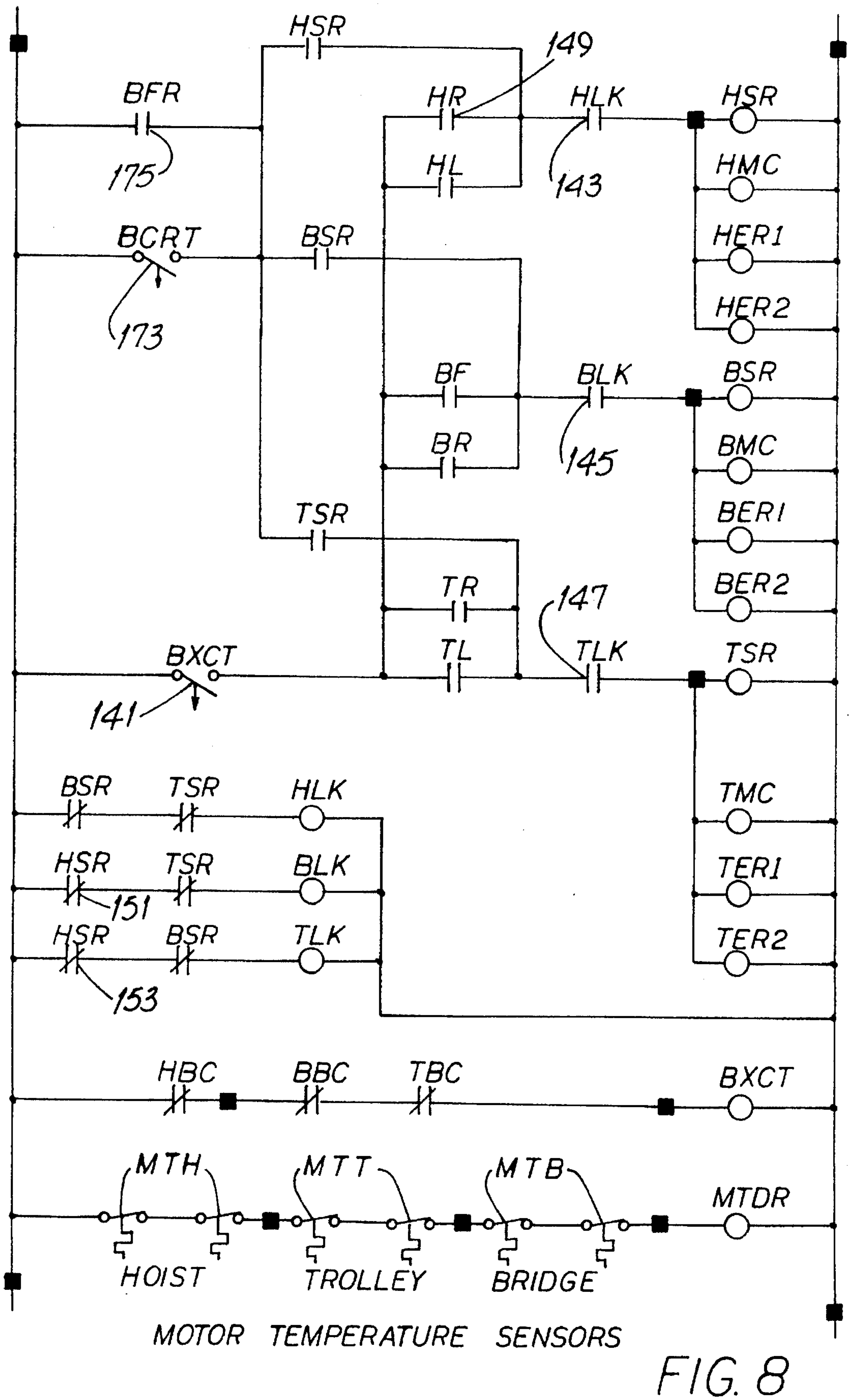
FIG. 8 is a diagram of logic circuitry of the new drive system.

It is to be noted that the contacts 93, 95, 97 of the button F controlling the bridge "forward" function have three contacts 160, 161 and 162 of a bridge lockout relay BLK connected therewith. Similarly, the buttons U and D controlling the hoist function have the contacts 159, 165 and 167 of a hoist lockout relay HLK connected therewith. The contacts 159, 160, 161, 162, 165, 167 each comprise a lockout device embodied as contacts of a relay HLK or BLK as shown in FIG. 8. When, for example, the hoist motor MH is operated, the hoist selection relay HSR is energized and its contact 151 opens. Therefore, the bridge lockout relay BLK is de-energized and its contacts 160, 161 and 162 are open to prevent energization of the second motor, e.g., bridge motor MB. This feature helps assure "one-function-at-a-time" operation.

Referring particularly to FIGS. 2, 6 and 7, there is a likelihood (perhaps a high likelihood) that the machine to which the system 10 is applied will require different performance characteristics from each of the motors. This will almost certainly be true where one motor is asymmetrically loaded as is the case with the hoist motor MH. (Such motor MH is asymmetrically loaded since, because of gravity, a load suspended from the hook 31 will resist upward movement but aid downward movement. An inclined, upward-moving conveyor is another example of an asymmetrical load. The conveyed material resists being moved upward and tends to urge the conveyor backwards. Loads of the foregoing type are said to be "overhauling" loads.)

It will be appreciated from the foregoing that when the system 10 is used to power a three-motion crane 11, each of the motors MH, MB and MT is loaded in a somewhat different way. As examples, the hoist motor MH is asymmetrical loaded and involves considerations relating to the maximum rate at which a load should be lowered. The trolley motor MT drives only the trolley 25 and whatever load is suspended from the hook 31. The bridge motor MB drives the entire crane 11 including the bridge 14, the trolley 25 and any suspended load. For those reasons, it is preferred to specify, e.g., first, second and third sets of drive parameters for the first/hoist motor, second/bridge motor and third/trolley motor MH, MB and MT, respectively.

FIGS. 6 and 7 show a first set of parameters 111 and a second set of parameters 113 relating to the motors MH and MB, respectively. The first set of parameters 111 includes a parameter 115 establishing the maximum acceleration rate in the load-lowering direction and a different parameter 117 establishing the maximum acceleration rate in the load-raising direction.

For example, the former parameter 115 may require that acceleration from zero to full motor speed in the lowering direction occur in no less than, say, 1.5 seconds. In contrast, the latter parameter 117 may require that acceleration from zero to full motor speed in the raising direction occur in no less than, say, 3.1 seconds.

But other parameters for the first motor and/or the second motor may be the same for either motor direction and for either or both motors. As another example, the first and second sets of drive parameters 111, 113 each include a minimum motor speed parameter 119 and substantially the same minimum motor speed parameter 119, e.g., one RPM, is used for each set of drive parameters 111, 113. Each of the parameters of the sets 111, 113 is programmed into the drive unit 45 using a programming device 121 having a keyboard 123 and display 125.

As an example of how a parameter affects the performance of a motor, it is assumed that the parameter 127 of set 113 relates to forward acceleration of the bridge 14 and is 4.9 seconds. This means that the drive unit 45 will be controlled in such a way that the bridge motor MB will not be permitted to reach its rated speed of 1200 RPM (note the parameter 129) in less than 4.9 seconds even though the bridge forward pushbutton F is quickly and fully depressed. Considered another way, a parameter such as the parameter 129 "defines" the slope of a ramp-like plot of motor speed vs. time.

The drive unit 45, preferably an inverter, may be either of the "scalar" or "flux vector" type. The former type, which may be referred to as an open loop inverter, supplies electrical power to a motor at a voltage and at a frequency related to such voltage. Both generally increase or decrease simultaneously. And the voltage and frequency have a relationship to the value of the 0–10 volt DC speed reference signal mentioned above. However, there is no "feedback" signal, i.e., no encoder EH, EB or ET to indicate whether the motor is running at a speed commensurate with such voltage and frequency.

A flux vector inverter is of a type of drive known as a closed loop type. When the new system 10 uses such a drive unit (as it usually does if a hoist drum 29 or other asymmetrically-loaded drive is involved), the system 10 includes the shaft encoder EH coupled to the hoist motor MH for providing the feedback signal to the system 10 along the line 57. While the encoders EB and ET are not required for the bridge and trolley motors MB and MT, it is difficult to change the "personality" of a flux vector inverter to that of a scalar inverter. Therefore, bridge and trolley encoders EB and ET are used as a matter of expedience.

In the preceding description, a pendant control station 39 was described. While such stations 39 predominate in light-duty cranes 11, radio control is quite popular. With a radio-controlled crane, there is no physical attachment such as the pendant station cable 91.

Referring particularly to FIGS. 2 and 5, a radio-wave transmitter 41*a* may be used to operate the crane 11 in lieu of the pendant station 39. Such transmitter 41*a* has a button 131 for turning power on and off and another button 133 for energizing a main line contactor MLC (FIG. 2) feeding power to the entire system 10.

On the transmitter 41*a*, the first, second and third selection devices 75, 77, 79 are embodied as paddles or levers. Each lever moves in a continuum from a zero position to a full speed position and in so doing, initiates a step-free speed-related electromagnetic radiation (EMR) signal 135 radiated from the transmitter antenna 137. The levers are coupled to the control section 51 by a receiver 139 which receives the signal 135 from the antenna 137 and provides responsive output signals to the section 51.

Referring next to FIGS. 3 and 8, an explanation of transfer control and selection logic features of the system 10 will now be provided. It will be recalled that each motor MH, MB and MT is equipped with a separate spring-set, electromagnetically-released brake BRUH, BRUB, BRUT, respectively. When set, each such brake prevents its respective motor from turning and each such brake is controlled by a separate brake contactor BCH, BCB and BCT, respectively.

A command from the drive unit 45 to energize a contactor BCH, BCB or BCT to release a brake BRUH, BRUB or BRUT, respectively, (or to de-energize a contactor and set a brake) are the events controlling transfer of the system 10 to another motor. Once a motor MH, MB or MT has been selected and is operating, the transfer of the unit 45 from that motor to another motor cannot occur until (a) the brake BRUH, BRUB or BRUT of that motor is de-energized and (b) a short time has elapsed following such de-energization.

On the other hand, once the aforementioned events have occurred, the crane operator may then operate another device CH, CB or CT or another device 75, 77 or 79 to control another motor. To put it another way, transfer of the system 10 from motor to motor occurs without the necessity of the operator manipulating a transfer switch. Transfer is accomplished by the "logic" 10 described above.

Referring particularly to FIGS. 2 and 8, it is first assumed that all devices CH, CB, CT, 75, 77, 79 are in the "Off" position resulting in motion/direction relays in the de-energized (or off) state. Therefore, the "power contacts" of all brake contactors BCH, BCB and BCT are open and their respective normally-closed control circuit contacts HBC, BBC and TBC are closed. Because of such closed contacts, the timing relay coil BXCT is energized and its contact 141 is closed.

Notwithstanding, the selection relays HSR, BSR & TSR are de-energized and indicated pairs of the normally-closed lockout contacts of such relays are in series with the hoist, bridge and trolley lockout relays HLK, BLK and TLK, respectively. Therefore, such lockout relays HLK, BLK, TLK are energized.

The next following part of this specification describes how the system 10 functions when the crane operator desires to operate the hoist motor MH for load raising or lowering. As an example, it is assumed the operator wishes to raise a load and operates the U button on the pendant station 39. Closure of such button energizes the hoist raise relay HR and its contact 149 closes, energizing the relay HSR.

The normally-closed contacts 151, 153 of such relay HSR open to de-energize the bridge and trolley lockout relays BLK and TLK, respectively. Thereupon, contacts 145 and 147 open to "isolate" the bridge and trolley functions by preventing operation of the bridge and trolley selection relays BSR and TSR, respectively. And the relays BF, BR, TF and TR are also prevented from operating by normally-open contacts 161, 163, respectively.

Referring also to FIG. 2, the drive unit 45 has trolley and bridge input lines 155, 157, respectively, to the unit 45. (Such lines are also denoted as "PAR.T" and "PAR.B," respectively, to symbolize the fact that such lines effect operating parameter selection.) If a signal appears on line 157, for example, the system 10 "selects" the set of operating parameters 113 for the bridge motion. However, if there is no signal on either line 155, 157 (as would be the case when the hoist motor MH is operated as described immediately above), the system 10 selects by "default" (neither the bridge motor MB nor the trolley motor MT is being operated) the set of operating parameters 111 for the hoist motion.

Further (and continuing to assume that the hoist motor MH is being operated), the contacts 159, 165, 167 of the lockout relay HLK are connected in a way to permit the button U to effect control. However, the normally-open contacts 160, 161, 162 of the bridge lockout relay BLK and the normally-open contacts 163, 169, 171 of the trolley lockout relay TLK are open. Therefore, depressing the buttons F and R for the bridge function or the buttons L and R for the trolley function will have no effect and operation of the motors MB and MT is prevented.

It is to be appreciated that when the operator's hoist button U is at the "off" position, the "speed command" to the unit 45 is a "zero" command. That is, the motor MH is not being commanded to run at any speed.

When the button U is at the "off" position for a sufficient length of time (and assuming deceleration has occurred), the unit 45 initiates setting the hoist brake by de-energizing the brake release relay BRR and opening the contact 89. However, the unit 45 and motor MH are briefly retained in a "powered up" state by the delayed-opening contact 173 of a timing relay, the coil of which is in control section 51. After de-energizing such coil, the contact 173 remains closed for a period of time to implement a technique such as disclosed in the above-noted patents. If the system 10 is equipped with the optional apparatus of the above-noted Wendt et al. patent, the contact 175 (FIG. 8) and the contact 177 (FIG. 2A) of relay BFR maintain power to the unit 45 and the hoist motor MH to allow a load to be controllably lowered.

The logic involved in operating the bridge motor MB or the trolley motor MT is similar to that described above. A difference is that since neither of the motors MB or MT handles an overhauling load, it is not necessary to maintain those motors in a powered-up state to implement a technique such as disclosed in the above-noted patents. Another difference is that a signal is provided on line 155 or 157 so that system 10 selects the set of operating parameters for the trolley or bridge motor MT or MB, respectively.

Considering the foregoing, it will now be appreciated that the new system 10 has a drive unit 45 which is the sole drive unit providing power to the motors MH, MB, MT. Insofar as is known, such "shared inverter" drive system 10 is unique and offers a number of advantages including economy of manufacture, space-saving and weight reduction. And it should also be appreciated that for a particular drive system application, all of the motors thereon need not be powered by the same drive unit. There may be motors which need to be operated simultaneously and such motors will usually have a separate "dedicated" drive unit attached thereto. But on the same machine, there may be other motors where operation of a single motor to the exclusion of the others provides quite acceptable performance.

While the principles of the invention have been described in connection with but a few embodiments, it is to be understood clearly that such embodiments are exemplary and not limiting.

What is claimed:

1. In a drive system for an overhead crane, such system having (a) a control section, (b) an adjustable frequency drive unit coupled to the control section and providing electrical power, (c) a first motor powering a crane hoist, (d) a second motor providing horizontal motion, and (e) first and second multi-speed selection devices coupled to the control section and associated with the first and second motors, respectively, the improvement wherein:

the drive unit is connectable to the first motor or to the second motor and is the sole drive unit providing electrical power to the motors;

each motor is individually operable by a separate selection device;

the speed of the motor being powered is controlled by an operator manipulating one of the selection devices;

the system includes first and second electromagnetic lockout devices, each including an electrical contact; and when the first motor is energized, the electrical contact of the first lockout device prevents energization of the second motor.

2. The system of claim 1 wherein:

the second selection device comprises an electrical contact which is closed to energize the second drive motor; and the first lockout device has an electrical contact in series with the second selection device.

3. The system of claim 1 including first and second sets of drive parameters relating to the first and second motors, respectively, and wherein (a) the first motor drives a hoist for raising and lowering loads and (b) the first set of parameters includes a parameter establishing the maximum acceleration rate in the load-lowering direction and a different parameter establishing a different maximum acceleration rate in the load-raising direction.

4. The system of claim 1 wherein:

the drive unit has a set of shaft encoder terminals; and the first and second motors have first and second shaft encoders attached respectively thereto, each encoder providing an encoder output signal; and the encoder output signals are both applied to the shaft encoder terminals.

5. The system of claim 1 wherein:

the drive unit includes first and second sets of drive parameters relating to the first and second motors, respectively; and the first and second sets of drive parameters each include a minimum motor speed parameter.

6. The system of claim 5 wherein substantially the same minimum motor speed parameter is used for each set of drive parameters.

7. The system of claim 1 in combination with an overhead crane and wherein:

the first and second selection devices each include a respective stepped-function push button mounted in a pendant control station suspended from the crane;

the control station includes plural output terminals providing a speed-related signal thereon; and the same output terminals are used to provide speed-related signals for both the first and second selection devices.

8. The system of claim 1 including a first temperature sensor for the first motor and wherein:

the first temperature sensor is shorted except when the first selection device is actuated.

* * * * *